US012248112B2

(12) United States Patent
Ogilvie

(10) Patent No.: US 12,248,112 B2
(45) Date of Patent: Mar. 11, 2025

(54) FRAME WITH ACOUSTIC SOURCES FOR MARINE SURVEY

(71) Applicant: Fugro Technology B.V., Leidschendam (NL)

(72) Inventor: Angus James Stephen Ogilvie, Aberdeen (GB)

(73) Assignee: Fugro Technology B.V., Leidschendam (NL)

( * ) Notice: Subject to any disclaimer, the term of this patent is extended or adjusted under 35 U.S.C. 154(b) by 115 days.

(21) Appl. No.: 16/644,145

(22) PCT Filed: Sep. 28, 2018

(86) PCT No.: PCT/NL2018/050642
§ 371 (c)(1),
(2) Date: Mar. 3, 2020

(87) PCT Pub. No.: WO2019/066654
PCT Pub. Date: Apr. 4, 2019

(65) Prior Publication Data
US 2020/0408944 A1    Dec. 31, 2020

(30) Foreign Application Priority Data

Sep. 29, 2017   (NL) ..................................... 2019642

(51) Int. Cl.
*G01V 1/38*           (2006.01)
(52) U.S. Cl.
CPC ................... *G01V 1/3808* (2013.01)
(58) Field of Classification Search
CPC .................................................. G01V 1/3808
See application file for complete search history.

(56) References Cited

U.S. PATENT DOCUMENTS

| 4,858,201 A |   | 8/1989 | Harrison |
| 4,870,625 A | * | 9/1989 | Young ................. G01V 1/3808 |
|  |  |  | 367/75 |

(Continued)

FOREIGN PATENT DOCUMENTS

| CN | 103823252 A | * | 5/2014 |
| WO | 2017155391 A1 |  | 9/2017 |
| WO | 2019066654 A1 |  | 4/2019 |

OTHER PUBLICATIONS

International Search Report and Written Opinion; PCT Application No. PCT/NL2018/050642; mailed Mar. 13, 2019.

*Primary Examiner* — Isam A Alsomiri
*Assistant Examiner* — Abdallah Abulaban
(74) *Attorney, Agent, or Firm* — Polsinelli PC

(57) ABSTRACT

A marine survey system and method for ultrahigh resolution (UHR) mapping of a marine bottom (B) below a body of water (W) by means of a frame (20) towed as a whole by one or more towing cables (12) at a distance (Xf) behind a marine vessel (10) moving over the water (W) in a movement direction (V). The frame (20) comprises a rigid framework (23) and a plurality of independent acoustic sources (21), wherein each acoustic source (21) is independently controlled to emit a separate acoustic wave (A) propagating through the water (W) and reflecting off bottom regions of the marine bottom (B) for the mapping thereof. The acoustic sources (21) are kept fixated by the rigid framework (23) at a source-to-source distance (Ys) less than four meters in a transverse direction (Y) perpendicular to the movement direction (V) of the vessel (10) to distinguish the bottom regions with an ultrahigh resolution (Ry) of less than two meters at least in the transverse direction (Y).

12 Claims, 3 Drawing Sheets

(56) References Cited

U.S. PATENT DOCUMENTS

| | | | | |
|---|---|---|---|---|
| 5,469,404 | A | * | 11/1995 | Barber .................. G01V 1/006 367/16 |
| 9,921,321 | B2 | * | 3/2018 | Kuvshinov .......... G01V 1/3808 |
| 2004/0000446 | A1 | * | 1/2004 | Barber, Sr. ............... G01V 1/04 181/116 |
| 2014/0153361 | A1 | * | 6/2014 | Karlsen .................... G01V 1/38 367/20 |
| 2016/0061981 | A1 | * | 3/2016 | Long ................... G01V 1/3817 367/16 |
| 2016/0124104 | A1 | | 5/2016 | Kim et al. |
| 2017/0219731 | A1 | * | 8/2017 | Eriksen .................. G01V 1/345 |

\* cited by examiner

FRAME WITH ACOUSTIC SOURCES FOR MARINE SURVEY

CROSS-REFERENCE TO RELATED APPLICATIONS

This application is a national stage application of International Application No. PCT/NL2018/050642, which was filed on Sep. 28, 2018, which claims priority to Netherlands Application Number 2019642 filed on Sep. 29, 2017, of which is incorporated by reference in its entirety.

TECHNICAL FIELD AND BACKGROUND

The present disclosure relates to a marine survey systems and methods for ultrahigh resolution mapping of a marine bottom and sub-bottom.

For 3D seismic surveys, it is known to tow multiple sound sources and cables. For example, US 2017/0115419 A1 describes marine surveys carried out with multiple source arrays comprising three or more sources.
Each source of a multiple source array is an array of source elements, such as air guns. The sources of a multiple source array may be arranged in particular type of configuration that is effectively maintained while the survey vessel travels a sail line. The sources of the multiple source array are activated to acoustically illuminate a subterranean formation with acoustic signals. Two or more sources of a multiple source array may be activated to create blended seismic data Usually the bin size of a seismic survey is on the order of 3 to 25 m along track and 6 to 25 m cross track. The typical tow configuration is 2 to 8 or more streamers towed and typically 2 sources. With 2-4 streamers the inner streamers may be towed from the boat and the outer streamers may be towed from spreader bars attached to the vessel. When many streamers are used or to cover wide spacing in water vanes can be used to pull the cables apart and the heads of the cables are typically attached to each other via some form of tether. In the known systems and methods for marine survey the sources are towed independently from each other, usually from the stern of the vessel.

There is yet a desire for some applications to improve resolution of marine surveys, e.g. to map objects with one meter diameter or less.

SUMMARY

For ultrahigh resolution seismic bin sizes can be much smaller than for conventional systems mentioned above. Bin sizes may be as small as one by one meter, or 0.5 meter along track and 1 meter cross track. The result of this smaller bin size is that the in water configuration becomes smaller and all the components towed closer together. For example, in the case of one meter cross track bin size, a system with four sources and four receiver cables (streamers) would need the cables eight meters apart from each other and the sound sources two meters apart from each other.
Managing towed objects this close together in a moving sea is likely to result in a tangled mess. To alleviate these and other problems, the present disclosure aims to provide the improved marine survey systems and methods.

Aspect of the present disclosure thereto provide a system or method for ultrahigh resolution (UHR) mapping of a marine bottom below a body of water. A frame is towed as a single unit by one or more towing cables at a distance behind a marine vessel moving over or through the water in a first direction. The frame comprises a rigid framework and a plurality of independent acoustic sources. Each acoustic source is controlled to emit a separate acoustic wave propagating through the water and reflecting off bottom regions at or inside the marine bottom for the mapping thereof. Advantageously, the acoustic sources are kept fixated by the rigid framework at a predetermined source-to-source distance.

By placing multiple closely spaced independent sources in a rigid frame and towing the frame as a whole, the tangling of otherwise separate towing cables can be prevented, while still having the reduced bin sizes. This may enable higher resolution mapping than previously possible with less complications. Also, having multiple independent sources on a single frame can provide a fixed and constant spacing between the sources for better relative positioning. By setting the source-to-source distance less than four meters, e.g. two meters, in a transverse direction perpendicular to the movement direction of the vessel the bottom regions may be distinguished (revolved) with a resolution of less than two meters, e.g. one meter at least in the transverse direction.

The independent acoustic sources as described herein should be distinguished from a conventional source array with multiple transducers which fire in unison to produce a single effective wave. In fact it is preferred, in some embodiments, that each independent acoustic source, as described herein, itself comprises a respective array of acoustic transducers, wherein the acoustic transducers of the respective array are configured to fire in unison to collectively emit the separate acoustic waves.

BRIEF DESCRIPTION OF DRAWINGS

These and other features, aspects, and advantages of the apparatus, systems and methods of the present disclosure will become better understood from the following description, appended claims, and accompanying drawing wherein:

DESCRIPTION OF EMBODIMENTS

Figure 1:
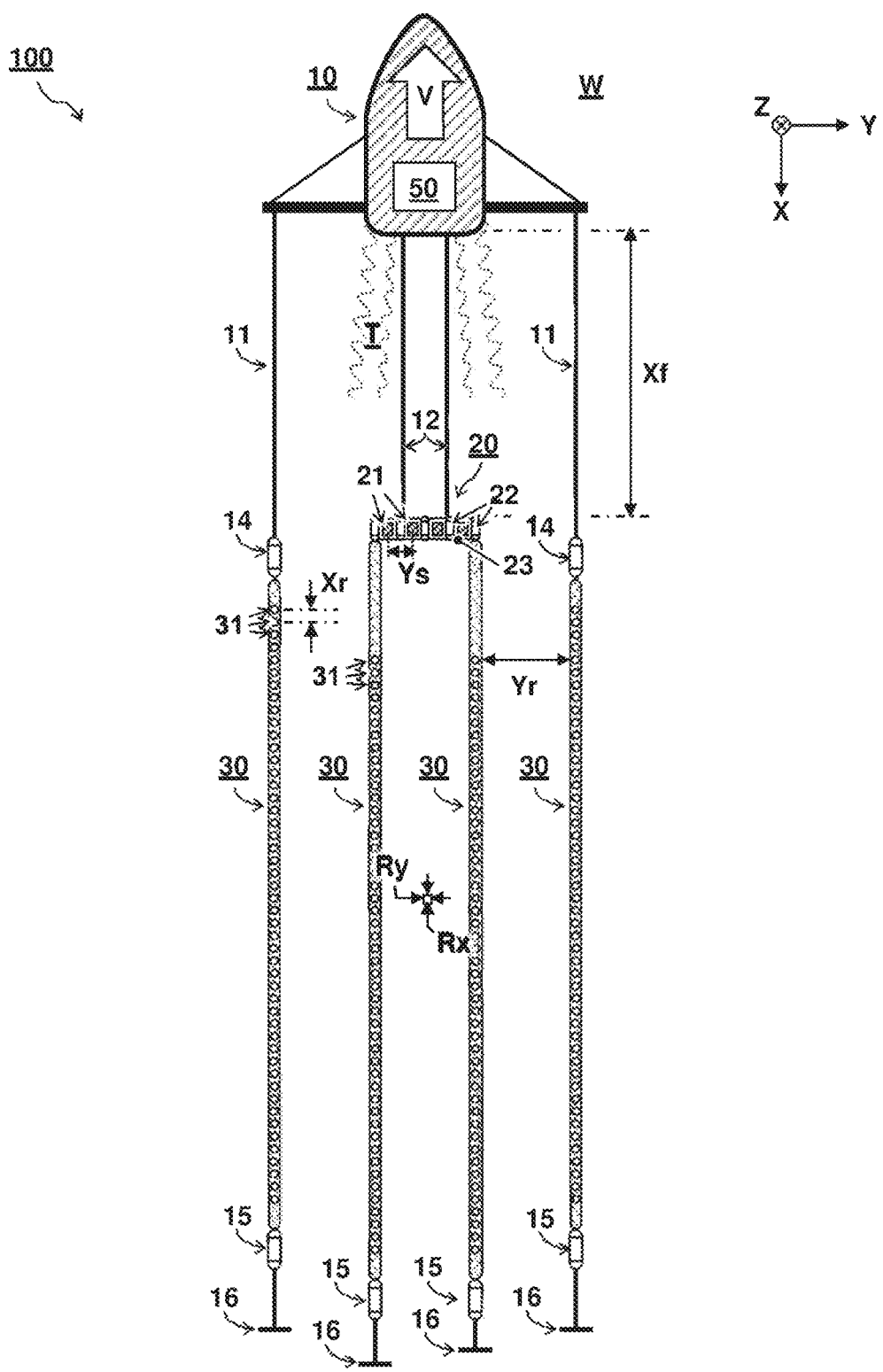
FIG. 1 illustrates a top view of a preferred embodiment for marine survey using a vessel towing a frame with acoustic sources and multiple streamers, each comprising a string of acoustic receivers.

Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise it will be understood that when a connection between structures or components is described, this connection may be established directly or through intermediate structures or components unless specified otherwise.

The invention is described more fully hereinafter with reference to the accompanying drawings, in which embodiments of the invention are shown.

In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

FIG. 1 illustrates a top view of a preferred embodiment for a marine survey system 100 for mapping a marine bottom below a body of water "W".

In a preferred embodiment, the system 100 is suitable for ultrahigh resolution UHR mapping of the marine bottom and sub-bottom. Thereto, the system 100 preferably comprises a frame 20 to be towed as a whole by one or more towing cables 12 at some distance "Xf" behind a marine vessel 10 as shown in FIG. 1. Typically the vessel 10 moves over or through the water "W" in a movement direction at a steady velocity "V", e.g. along a predetermined trajectory or sail line.

The system 100 preferably comprises a plurality of acoustic receivers 31 for registering the acoustic waves reflected from the marine bottom and sub-bottom. Typically, the acoustic receivers 31 comprise transducers, e.g. hydrophones, configured to register the particulars such as timing and amplitude of the acoustic wave in the water and convert these into electrical signals for analysis. For example, a time between the emission and receipt of an acoustic wave can be used to determine a distance to a reflecting structure at the marine bottom "B", or there below e.g. within the sediment.

In a preferred embodiment, e.g. as shown with continued reference to FIG. 1, the system 100 comprises a plurality of so-called streamers 30. A streamer 30 typically comprises a number of acoustic receivers 31 towed in a line behind the vessel 10. As shown the acoustic receivers 31 are thus linearly arranged in the movement direction "V" of the vessel 10. For example, the system comprises at least two streamers 30, preferably at least four streamers 30, or more. Streamers may also comprise other features such as buoys 14,15 and/or respective drogues 16 at the end of each streamer. Preferably, the drogues 16 are kept at different distances along the movement coordinate "X" to further prevent tangling.

Preferably the acoustic receivers 31 are arranged at a relatively low receiver-to-receiver distance "Xr" for distinguishing the bottom regions with an ultrahigh resolution Rx also in a tangential direction X parallel to the movement direction "V" of the vessel 10. For example, the receiver-to-receiver distance "Xr" is less than four meter, preferably less than three meter, more preferably two meters, or less, e.g. two meter, to map the marine bottom and sub-bottom with an ultrahigh resolution Rx of one meter, or, e.g. one meter, to map the marine bottom and sub-bottom with an ultrahigh resolution Rx of half a meter, in the movement direction "V".

Typically, each acoustic receiver 31 is configured for individual readout of acoustic signal registered by the respective acoustic receiver 31. Furthermore each streamer 30 may comprises more than ten, more than twenty, or even more than forty separately acoustic receivers 31. In a preferred embodiment, as shown in FIG. 1, at least two streamers 30 are attached to the frame 20. For example, the two streamers are attached at outer ends of the frame in the transverse direction "Y". In such embodiments it is furthermore preferred that the plurality of independent acoustic sources 21 are all arranged in the transverse direction "Y" between the two adjacent streamers 30 attached to the frame 20.

As also illustrated in FIG. 1, it is preferred in some embodiments that at least two inner streamers 30 are attached to the frame 20 and at least two outer streamers are towed directly by the vessel 10 without attachment to the frame 20. For example, the outer streamers 30 are towed by spreader bars extending outward from each side of the vessel 10 to improve the covered area for surveying.

Typically, the system 100 comprises a controller 50. For example, the controller 50 is configured (i.e. arranged and/or programmed) to perform the operational acts in accordance with the marine survey as described herein. The controller 50 may be placed on board the vessel 10 in some embodiments as illustrated in FIG. 1. In some embodiments, the controller 50 is configured to control the acoustic sources 21 to emit the respective acoustic waves "A". In other or further embodiments, the controller 50 is configured to receive and/or process signals from the acoustic receivers 31.

Figure 2A:
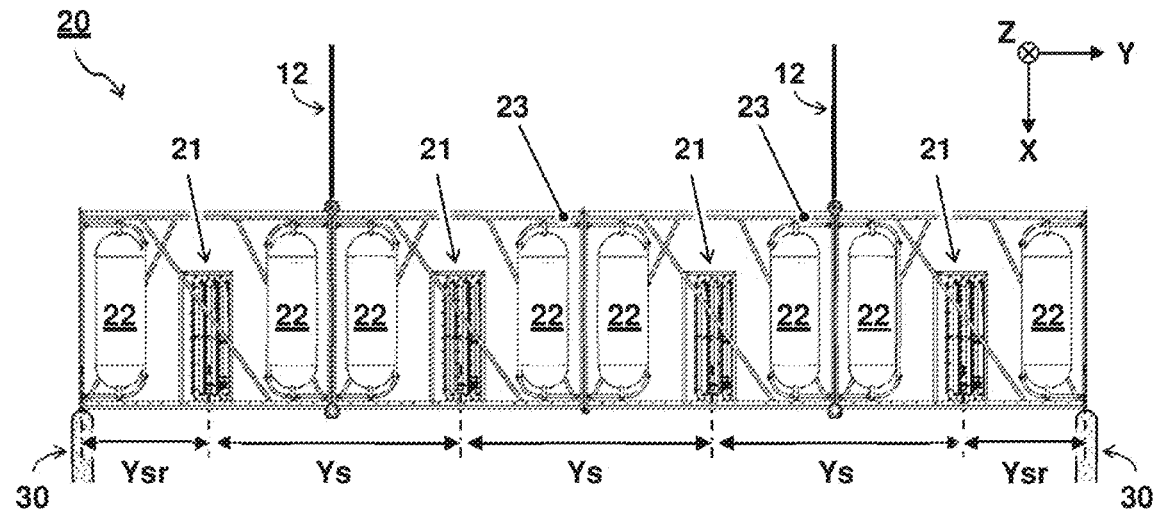
FIGS. 2A-2C illustrate various views of an embodiment of the frame with acoustic sources.
Figure 2B:
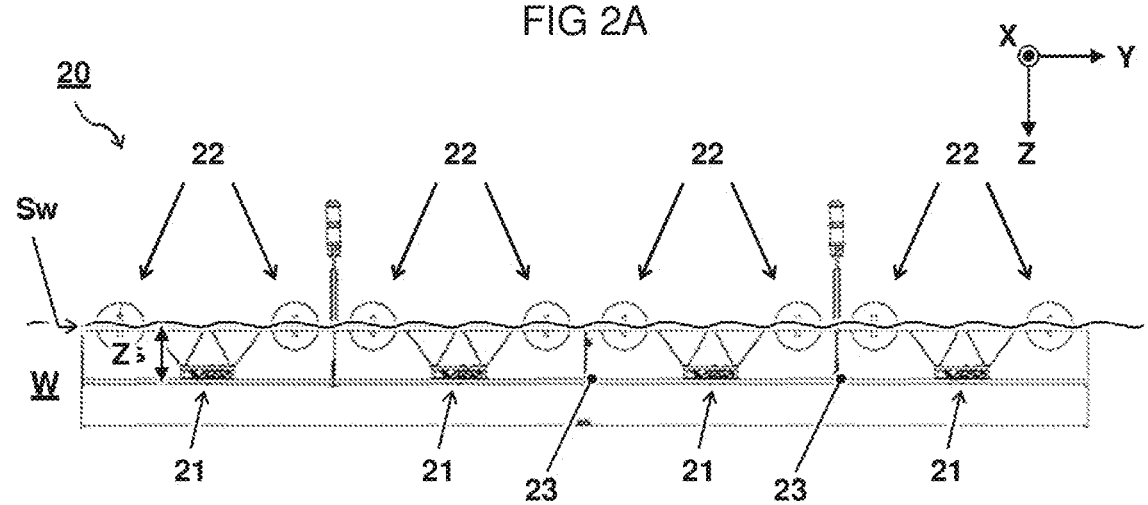
Figure 2C:
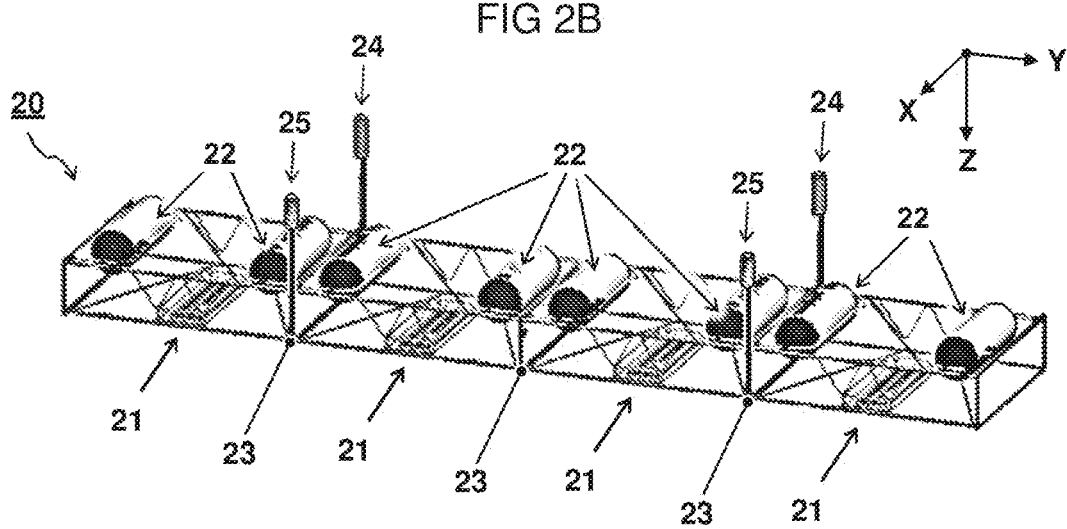

FIGS. 2A-2C illustrate various views of an embodiment of a frame 20 with acoustic sources.

In a preferred embodiment, the frame 20 comprises a rigid framework 23 and a plurality of independent acoustic sources 21. For example, the rigid framework 23 preferably comprises a truss structure as shown in FIGS. 2A-2C. The acoustic sources 21 are kept fixated by the rigid framework 23 at a source-to-source distance "Ys" in a transverse direction "Y" perpendicular to the movement direction "V" of the vessel 10 for distinguishing the bottom regions with a corresponding resolution Ry. As shown, the acoustic sources 21 are preferably linearly arranged in the transverse direction "Y" parallel to the water surface Sw.

As shown e.g. in FIG. 2A, a transverse distance "Ysr" between a respective streamer 30 attached to the frame (20) and nearest acoustic source 21 is preferably half the source-to-source distance "Ys". Accordingly, the streamer-to-streamer distance "Yr" in the transverse direction "Y" is a little more than a total width spanned by the plurality of acoustic sources 21. Typically the streamer-to-streamer distance "Yr" can be equal to the number of acoustic sources 21 times the respective source-to-source distance "Ys" there between. For example, for a frame 20 with four acoustic sources 21 placed at a source-to-source distance "Ys" of two meters, the streamer-to-streamer distance "Yr" can be eight meters. Generally, N sources together span a width of $(N-1)*Ys$ to which is added two times half the distance Ys at each end of the spanned length for attaching the streamers.

With continued reference to FIGS. 2A-2C, the frame 20 may comprise one or more floatation devices 22. Preferably the frame 20 is kept at least partially afloat with the acoustic sources 21 at a fixed source depth Zs below a surface Sw of the water "W" as shown particularly in FIG. 2B. Preferably, the source depth Zs is adjustable e.g. by adjusting a relative depth of the acoustic sources 21 with respect to the one or more floatation devices 22.

Preferably, the system 100 comprises one or more positioning units 24, e.g. operating on the basis of a Global Position System GPS, preferably differential GPS, e.g. Real Time Kinematic RTK. For example, as shown in FIG. 2C, at least one, preferably two, positioning unit 24 are attached to the frame 20 with a known relative position or positions with respect to the acoustic sources 21. Advantageously, two positioning unit 24 can be attached at spaced apart locations on the frame 20 to determine the position of more than two, e.g. four acoustic sources 21, in some embodiments.

With continued reference to FIG. 2C, preferably the frame 20 comprises a wireless transmitter and/or receiver 25 configured to transmit data between the frame 20 and the vessel 10. In some embodiments, control data can be sent wirelessly from a controller 50 on the vessel 10 to a transceiver 25 on the frame 20 to control the acoustic sources 21.

Alternatively, or in addition, the sources may also be under (partial or full) control of a local control unit (not shown) on the frame 20 itself. In some embodiments, measurement data can be sent wirelessly from a transceiver 25 on the frame 20 to a controller 50 and/or other processing unit on the vessel 10 to receive and/or process the measurement data. For example, the measurement data may include acoustic signals recorded by the acoustic receivers 31, positioning information from the one or more positioning units 24, depth information of the sources and/or receivers, et cetera.

Alternatively, or in addition to wireless connections there can also be wired connections between the vessel 10 and frame 20. In particular, electrical energy supply can be provided from a generator or battery on the vessel 10 to the equipment on the frame 20 and/or streamers 30. Using wireless data transfer instead of wired data transfer can be advantageous to prevent interference especially from high voltage electrical wiring which is typically used to supply the acoustic sources 21, .e.g. sparkers.

Figure 3:
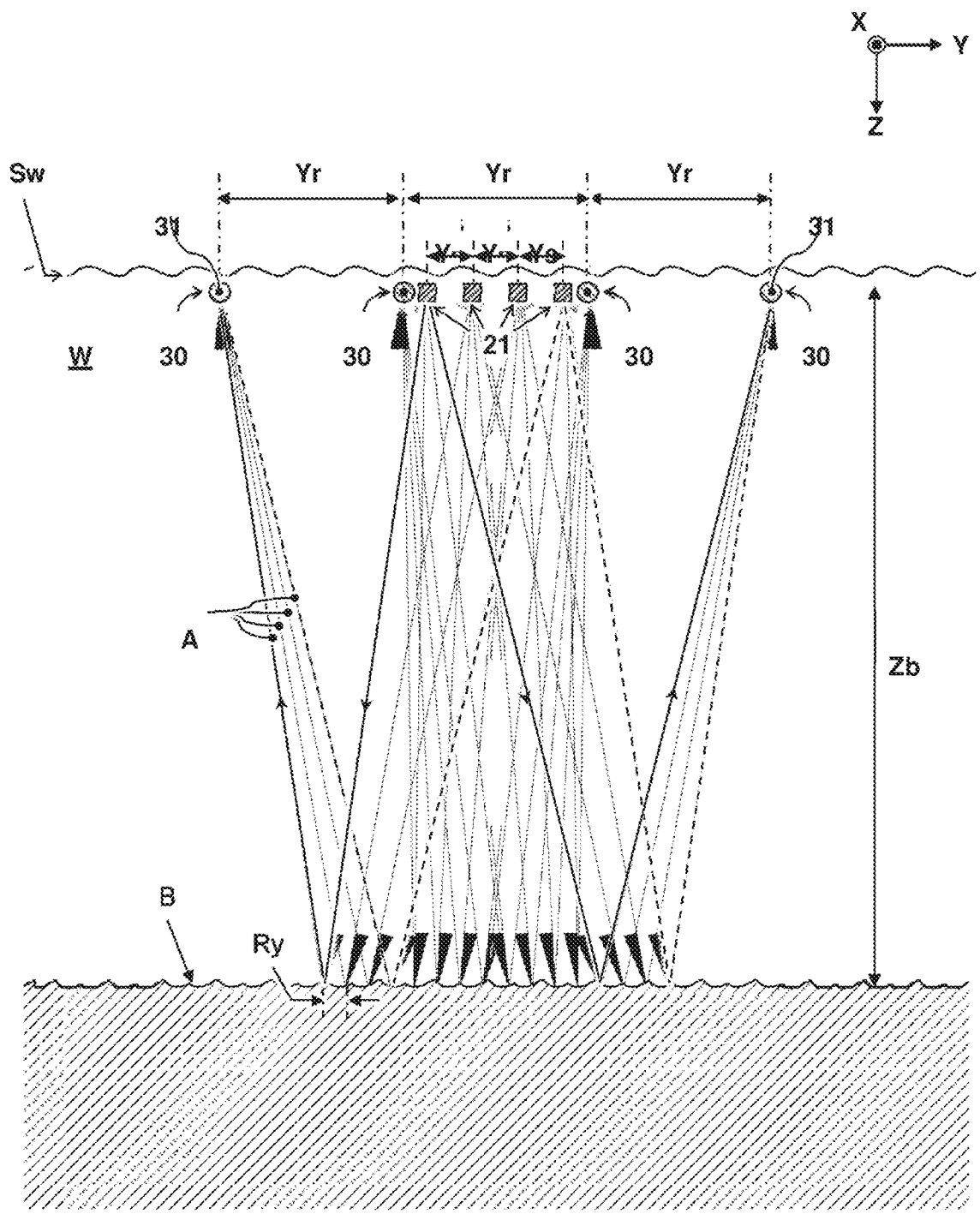
FIG. 3 illustrates the propagation of acoustic waves via the marine bottom between the acoustic sources and acoustic receivers in some embodiments.

FIG. 3 illustrates the propagation of acoustic waves "A" via the marine bottom "B" between the acoustic sources 21 and acoustic receivers 31 in some embodiments.

Each acoustic source 21 is preferably independently controllable to emit a separate acoustic wave "A". Each of the acoustic waves A may thus propagates along its own (unique) path through the water "W" to reflects off respective bottom regions at (or inside) the marine bottom "B" for the mapping thereof. Typically, the resolution Ry in the transverse direction "Y" is half the source-to-source distance "Ys" in transverse direction "Y". This can be understood e.g. from FIG. 3 which shows that the half way points of shortest reflected paths between the respective sources and receivers are spaced apart by half the distance between the sources.

To attain desired high resolution, the source-to-source distance "Ys" is preferably less than four meter, more preferably less than three meter, most preferably two meters, or less, to map the marine bottom with a transverse resolution Ry of one meter, or less. On the other hand the source-to-source distance "Ys" is typically at more than half a meter, preferably more than one meter e.g. to keep the acoustic waves "A" and/or originating sources 21 apart.

In some embodiments, each acoustic source 21 comprises a respective array of acoustic transducers. In such embodiments, the acoustic transducers of the respective array are configured to fire in unison to collectively emit the separately detectable respective acoustic wave "A", as described herein. For example, each acoustic source 21 comprises at least three, typically many more, acoustic transducers. Typically, the transducers making up such an acoustic source 21 are relatively close together to determine an spatial extent of the acoustic source 21. For example, the array of transducers in a respective acoustic source 21 are arranged within half a meter, within thirty centimeters, or less, from each other, so that they can collectively fire the acoustic wave by constructive and destructive interference of their respective waves. For example, the extent of each acoustic source 21 is less than half, preferably less than a quarter of the distance between the acoustic sources 21. In some embodiments, the acoustic transducers comprise so-called sparkers which use a high electric potential to cause a discharge in to the water creating a short-lived plasma causing pressure waves, i.e. acoustic signals. Of course also other acoustic sources/transducers can be used such as air guns.

In a preferred embodiment, the acoustic waves of the independent acoustic sources 21 are fired sequentially with a time interval there between. A minimum interval between subsequent acoustic waves may be determined e.g. by a depth Zb of the marine bottom "B" or depth of structures to be detected there below. For example, for a depth of 50 m and a sound velocity in water of 1500 m/s, the sound wave may take at least 2*50/1500=0.07 seconds to reflect straight from the bottom and longer if the reflection comes from below the bottom or at an angle. On the other hand, a maximum interval between subsequent acoustic waves may be determined e.g. by a movement velocity of the vessel 10, number of independent acoustic sources 21, and the distance between acoustic receivers 31.

Preferably, each of the acoustic sources has an opportunity to emit its acoustic wave within the time interval that it takes the vessel to move the distance "Xr" between the acoustic receivers. For example for a system with a receiver-to-receiver distance of 1 m and a towing velocity of 2 m/s, it takes half a second for each source to move the distance to the previous position of the adjacent source. So for example in a system with four independent acoustic sources firing within half a second, the interval between acoustic waves is 0.5/4=0.125 seconds, or less. So for marine survey of relatively shallow water of fifty meters or less, and a moderate velocity of two meters per second, the interval between subsequent acoustic waves can be chosen e.g. at about a tenth of a second, or at least in a range between 0.01 and 1 second.

This may also means that the (collective) acoustic waves "A" themselves may be shorter than one tenth of a second, preferably much shorter, e.g. less than ten millisecond, less than one millisecond, or less. Accordingly, for an acoustic source comprising an array of transducers, the transducers should typically all fire in unison within that time period to generate the collective wave. The duration or wavelength of the acoustic wave "A" may also be related to the resolution which can be attained, with shorter waves typically allowing better resolution.

In some aspects, a marine vessel 10 or equipment on board such vessel may form part of the marine survey system 100 as described herein. In a preferred embodiment, one or more towing cables 12 are attached to the frame 20 for towing the frame 20 at a distance "Xf" behind the vessel 10, wherein the distance "Xf" between the frame 20 and the vessel 10 is set to avoid a region of turbulence Tin the water T caused by the vessel 10. For example, the distance "Xf" is more than ten meters, more than twenty meters, more than fifty meters, more than more than hundred meters, or more. Preferably at least two towing cables 12 are attached between the frame 20 and the vessel 10 at spaced apart locations on the frame for preventing rotational movement of the frame 20 being towed through the water "W". Aspects as described herein may also be embodied as a marine survey method for ultrahigh resolution UHR mapping of a marine bottom "B" below a body of water "W" by means of a frame 20 towed as a whole by one or more towing cables 12 at a distance "Xf" behind a marine vessel 10. Some aspects can also be embodied as a machine readable medium storing software instructions that, when executed e.g. by a controller 50 of a marine survey system 100, cause the execution of the marine survey methods as described herein.

For the purpose of clarity and a concise description, features are described herein as part of the same or separate embodiments, however, it will be appreciated that the scope of the invention may include embodiments having combinations of all or some of the features described.

Of course, it is to be appreciated that any one of the above embodiments or processes may be combined with one or more other embodiments or processes to provide even further improvements in finding and matching designs and advantages. In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined together or separated into further portions unless specifically stated otherwise. Where one claim refers to another claim, this may indicate synergetic advantage achieved by the combination of their respective features. But the mere fact that certain measures are recited in mutually different claims does not indicate that a combination of these measures cannot also be used to advantage. The present embodiments may thus include all working combinations of the claims wherein each claim can in principle refer to any preceding claim unless clearly excluded by context.

The invention claimed is:

1. A marine survey system for ultrahigh resolution mapping of a marine bottom below a body of water, the system comprising:
   a frame to be towed as a unit by one or more towing cables at a distance behind a marine vessel moving over the water in a first direction, the frame comprising:
   a rigid framework and a plurality of independent acoustic sources, wherein each acoustic source is controllable to emit a separate acoustic wave propagating through the water and reflecting off bottom regions at or inside the marine bottom for the mapping thereof, wherein the acoustic sources are rigidly affixed to the rigid framework, and the acoustic sources are arranged in a linear array and the linear array is arranged perpendicular to a movement direction of the marine vessel by the rigid framework at a constant source-to-source distance of equal to or greater than one meter and less than two meters in the transverse direction for distinguishing the bottom regions with a resolution of less than two meters at least in the transverse direction, and
   a plurality of floatation devices arranged to keep the acoustic sources at a source depth below a surface of the body of water; and
   at least two streamers attached to the frame at a distance equal to a number of acoustic sources multiplied by the source-to-source distance, each streamer comprising a string of acoustic receivers towed in a line behind the marine vessel, wherein the acoustic receivers are linearly arranged at less than four meters apart in the movement direction of the marine vessel.

2. The marine survey system according to claim 1, wherein the plurality of independent acoustic sources are arranged in the transverse direction between two adjacent streamers attached to the frame.

3. The marine survey system according to claim 1, wherein at least two inner streamers are attached to the frame and at least two outer streamers are towed directly by the marine vessel without attachment to the frame.

4. The marine survey system according to claim 1, wherein acoustic receivers are arranged at a receiver-to-receiver distance of less than four meters for distinguishing the bottom regions with an ultrahigh resolution also in a tangential direction parallel to the movement direction of the marine vessel.

5. The marine survey system according to claim 1, wherein each acoustic source comprises a respective array of acoustic transducers, wherein the acoustic transducers of the respective array are configured to fire in unison to collectively emit the separately detectable respective acoustic wave.

6. The marine survey system according to claim 1, wherein the source-to-source distance is more than two meters.

7. The marine survey system according to claim 1, comprising a controller configured to perform the operational acts including control of the acoustic sources to emit the respective acoustic waves and receiving signals from acoustic receivers.

8. The marine survey system according to claim 1, comprising one or more positioning units attached to the frame with a known relative position with respect to the acoustic sources.

9. The marine survey system according to claim 1, wherein the frame comprises a wireless transmitter configured to transmit data between the frame and the marine vessel.

10. A marine vessel comprising:
    a marine survey system comprising:
    a frame to be towed as a unit by one or more towing cables at a distance behind the marine vessel moving over the water in a first direction, the frame comprising:
    a rigid framework and a plurality of independent acoustic sources, wherein each acoustic source is controllable to emit a separate acoustic wave propagating through the water and reflecting off bottom regions at or inside the marine bottom for the mapping thereof, wherein the acoustic sources are rigidly affixed to the rigid framework, and the acoustic sources are arranged in a linear array and the linear array is arranged perpendicular to a movement direction of the marine vessel by the rigid framework at a constant source-to-source distance of equal to or greater than one meter and less than two meters in the transverse direction for distinguishing the bottom regions with a resolution of less than two meters at least in the transverse direction, and
    a plurality of floatation devices arranged to keep the acoustic sources at a source depth below a surface of the body of water; and
    at least two streamers attached to the frame at a distance equal to a number of acoustic sources multiplied by the source-to-source distance, each streamer comprising a string of acoustic receivers towed in a line behind the marine vessel, wherein the acoustic receivers are linearly arranged at less than four meters apart in the movement direction of the marine vessel.

11. The marine vessel according to claim 10, wherein one or more towing cables are attached to the frame for towing the frame at a distance behind the marine vessel, wherein the distance between the frame and the marine vessel is set to avoid a region of turbulence in the water caused by the marine vessel.

12. A marine survey method for ultrahigh resolution mapping of a marine bottom below a body of water via a frame towed as a unit by one or more towing cables at a distance behind a marine vessel moving over the water in a first direction, the frame comprising a rigid framework and a plurality of independent acoustic sources, wherein each acoustic source is independently controlled to emit a separate acoustic wave propagating through the water and reflecting off bottom regions at or inside the marine bottom for the mapping thereof, wherein the acoustic sources are linearly arranged in a transverse direction perpendicular to a movement direction of the marine vessel by the rigid framework at a source-to-source distance of equal to or greater than one meter and less than two meters in the transverse direction to distinguish the bottom regions with an ultrahigh resolution of less than two meters at least in the transverse direction, and a plurality of floatation devices arranged to keep the acoustic sources at a source depth below a surface of the body of water; and at least two streamers attached to the frame at a distance equal to a number of acoustic sources multiplied by the source-to-source distance, each streamer comprising a string of acoustic receivers towed in a line behind the marine vessel, wherein the acoustic receivers are linearly arranged at less than four meters apart in the movement direction of the marine vessel.

\* \* \* \* \*